United States Patent [19]
Rice

[11] Patent Number: 5,325,480
[45] Date of Patent: Jun. 28, 1994

[54] TEXTURE METHOD FOR PRODUCING FLUID EFFECTS IN A REAL-TIME SIMULATION

[75] Inventor: Jason T. Rice, Arlington, Tex.

[73] Assignee: Hughes Training, Inc., Arlington, Tex.

[21] Appl. No.: 945,752

[22] Filed: Sep. 16, 1992

[51] Int. Cl.⁵ .............................................. G06F 15/62
[52] U.S. Cl. ..................................................... 395/152
[58] Field of Search ............... 395/129, 130, 152, 125; 345/122

[56] References Cited

U.S. PATENT DOCUMENTS

| | | | |
|---|---|---|---|
| 4,855,934 | 8/1989 | Robinson | 364/521 |
| 4,945,495 | 7/1990 | Ueda | 364/518 |
| 5,097,427 | 3/1992 | Lathrop et al. | 395/130 |
| 5,179,638 | 1/1993 | Dawson et al. | 395/125 |
| 5,194,969 | 3/1993 | DiFrancesco | 358/463 |

Primary Examiner—Heather R. Herndon
Attorney, Agent, or Firm—Wanda K. Denson-Low

[57] ABSTRACT

A method of generating dynamically altering images which are capable of simulating fluid effects in real-time on a static scene. The method includes the steps of loading a plurality of graphical components, and repeatedly applying each of these graphical components to a texture map in a sequence of toroidally incremented locations at a predetermined repetition rate to create a texture map overlay for each of a plurality of scene frames. Each of these toroidally incremented locations are determined by a non-linear combination of a linear offset vector and the location of the last graphical component that has been applied. Then, each of the plurality of scene frames are transmitted to a visual projection device at a predetermined frame rate in order to display the dynamically altering images.

10 Claims, 4 Drawing Sheets

TEXTURE METHOD FOR PRODUCING FLUID EFFECTS IN A REAL-TIME SIMULATION

BACKGROUND OF THE INVENTION

1. Field of the Invention

The present invention relates generally to computer generated images, and particularing to a method of dynamically applying texture to achieve the appearance of natural motion in a static scene.

2. Description of Related Art

There are a variety of applications in which it would be desirable to provide motion in a static scene of a video or computer graphic image. For example, the ability to introduce realistic smoke plumes or fire effects to an image would be useful in fields which are diverse as entertainment, military, commercial and scientific industries. Nevertheless, prior attempts to introduce fluid or other dynamic effects to an image required the use of animation or linearly moving texture to simulate motion in a static scene. In this regard, it is well known that animation techniques are very memory intensive. Additionally, linear motion texture effects provide an unnatural image, as fluid effects have decidedly non-linear qualities.

Accordingly, it would be desirable to provide a method of providing a high degree of realism through fluid effect illusions which does not require substantial texture memory or rely on linear movements.

SUMMARY OF THE INVENTION

The present invention provides a method of generating dynamically altering images which are capable of simulating fluid effects in real-time on a static scene. The method includes the steps of loading a plurality of graphical components, and repeatedly applying each of these graphical components to a texture map in a sequence of toroidally incremented locations at a predetermined repetition rate to create a texture map overlay for each of a plurality of scene frames. Each of these toroidally incremented locations are determined by a non-linear combination of a linear offset vector and the location of the last graphical component that has been applied. Then, each of the plurality of scene frames are transmitted to a visual projection device at a predetermined frame rate in order to display the dynamically altering images.

Linear offset vectors are generally used for motion components in texture renderings. However, by treating a texture template or map as a broad continuous toroidal rotoscope, linear offset vectors can be applied to create the illusion of animation or multiple frame cycles of photographic or photoderived fluid effects. In this regard, it should be appreciated that the method according to the present invention requires much less texture memory than would be required with using multiple frames of complete images or cells. Additionally, the method according to the present invention is capable of simulating very non-linear movements and multiple motion/direction components in a scene using only one or relatively few repeating or tessellating texture images. Accordingly, it should be appreciated that a single processed image from graphical components can render more motion information and non-linear complexity than multiple additive images with independent motion offset vectors using, while using no more memory than required for a single graphical component.

Thus, natural scenes may be substantially enhanced by adding non-linear motion to a texture image which seems to pass over the surface of an otherwise two-dimension surface of the scene. Drift coefficients may also be added to provide further non-linear time dependent motion to graphical component sequences. Additionally, the graphical components themselves may be windowed, clamped at their boundaries or feathered to help blend the new graphical components into the surrounding texture map. This technique may be used to avoid jagged or sharp edges and provide a smoother, more continuous image which is suitable for tessellated texture maps over a large area.

DESCRIPTION OF THE PREFERRED EMBODIMENTS

Figure 1:
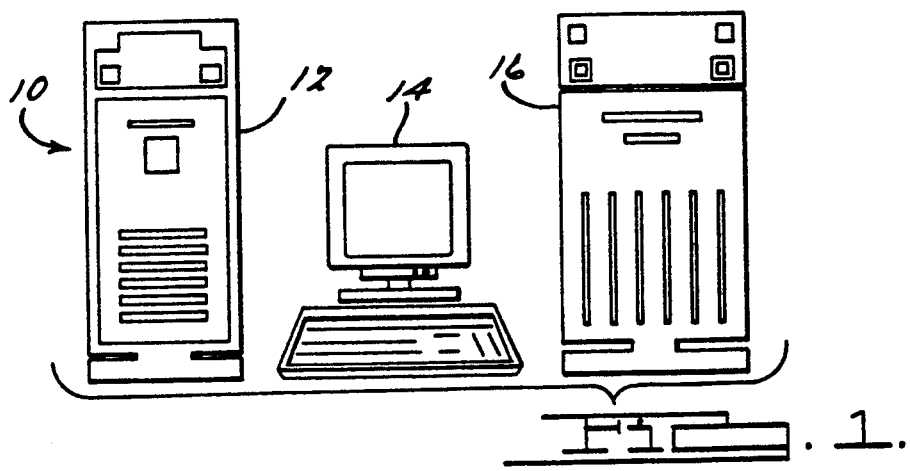
FIG. 1 is a diagrammatic representation of a computer system for generating the dynamically altering images according to the present invention.

Referring to FIG. 1, a diagrammatic view of a computer system 10 for generating the dynamically altering images according to the present invention is shown. The computer system 10 is generally represented by a workstation computer 12 and a monitor 14. In one embodiment according to the present invention, the workstation computer 12 is a Silicon Graphics, Inc. Iris workstation, such as one of the Iris Indigo line of RISC-based workstations. However, it should be appreciated that other suitable graphics computers could be employed in the appropriate application. It should also be appreciated the workstation computer 12 should be equipped with the proper memory capacity for storing the software according to the present invention and the file or files generated therefrom (e.g., a hard or floppy disk drive).

The computer system 10 also preferably includes an image generator which is capable of writing a texture map out to a frame buffer, in order to create a plurality of scene frames for sequential transmission to a visual projection device (e.g., monitor 14). While the image generator may form part of the workstation computer 12, it should also be appreciated that the image generator may be represented by a separate or networked computer. Accordingly, FIG. 1 is shown to include an image generator computer 16 to illustrate such a division of tasks. In one embodiment according to the present invention, the image generator computer 16 is comprised of an Evans & Sutherland ESIG 2000 computer. In addition to the appropriate memory capacity and video graphics adapter circuitry, the image generator computer 16 preferably includes suitable graphics library software, such as Silicon Graphics GL version 3.3.

The method according to the present invention begins with at least one graphical component. This graphical component forms the basis of a dynamically altering image which is generated by repeatedly applying the graphical component to a texture map in a sequence of torodially incremented locations to create a texture map overlay for each of a series of scene frames. In this regard, the graphical component may be created by using a drawing package, scanned by a digitizer and stored in a formatted file, or synthesized from a parametric algorithm. Accordingly, it should be understood that the graphical component may take any one of a variety of shapes which pertain to the dynamic image sought to be generated. Thus, for example, the graphical component could be a graphic primitive (e.g., an arc), a geometric figure (e.g., a polygon) or even an alphanumeric character (e.g., the letter Q). Additionally, it may also be possible to use a three-dimensional object as the graphical component (e.g., a voxel). Furthermore, a set of related or unrelated graphical components may also be employed to generate the dynamically altering image.

Figure 2:
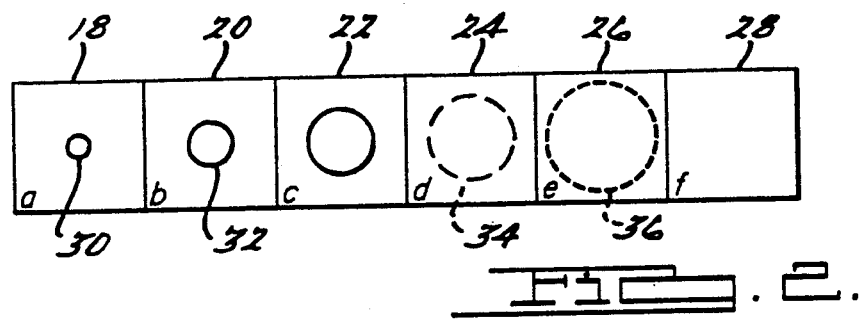
FIG. 2 is a pictorial representation of a series of graphical components to illustrate the development of a ripple.

Referring to FIG. 2, a pictorial representation of a series of different graphical components is shown to illustrate the development of a ripple. More specifically, FIG. 2 shows a series of image blocks 28 which generally contain one graphical component. Thus, for example, image block 18 includes a small circle 30, while image block 20 contains a larger circle 32. If these image blocks were layed directly over each other in a time controlled sequence, then the appearance of an expanding ripple from a drop of rain on an otherwise static body of water could be visualized. In this regard, the graphical components 34 and 36 represent an expanding ripple which is losing its three dimensional power with time. The image block 28 does not contain a graphical component simply to illustrate the steady state condition after the ripple has been exhausted. Accordingly, while each of the image blocks 18-26 contain a graphical component which in itself is static or non-variable, these graphical components may be utilized to convey movement.

Figure 3A:
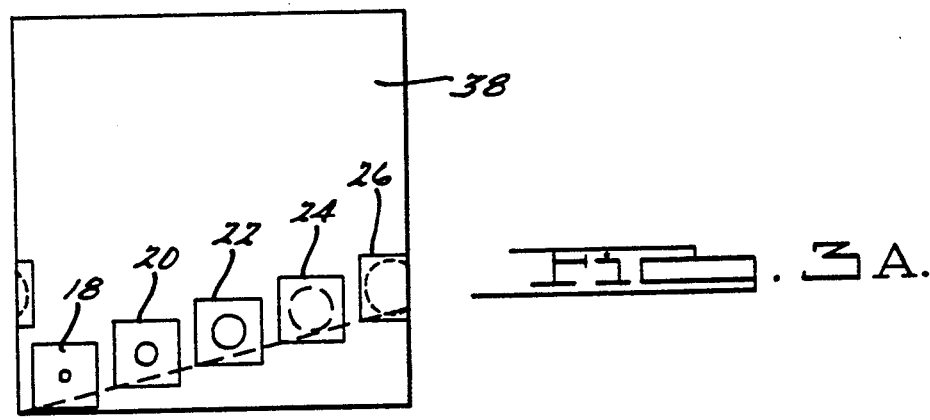
FIGS. 3A-3B provide a sequence of pictures which illustrate the development of a texture map image from the graphical components of FIG. 2.
Figure 3B:
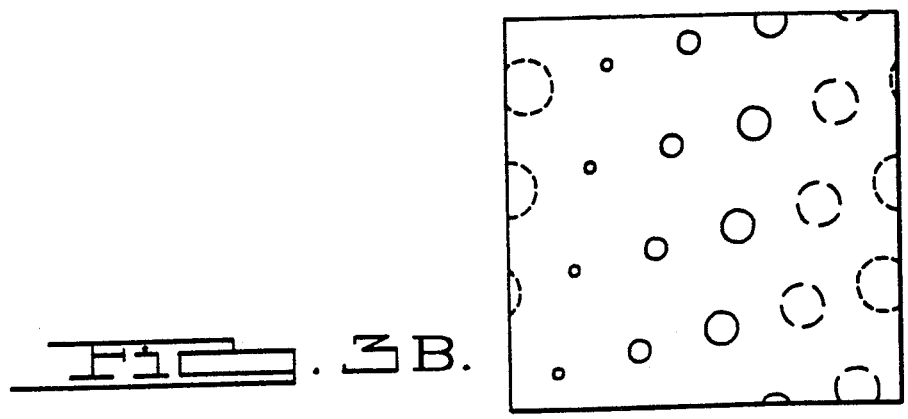

Referring to FIGS. 3A-3B, a sequence of pictures is shown to illustrate the development of a texture map image from the graphical components of FIG. 2. In particular, FIG. 3A shows an example of how the graphical components 30-36 may be applied or pasted to a texture map 38 in accordance with the present invention. The texture map 38 may be any suitable image surface, such as a bitmapped scene. Accordingly, it should be understood that the texture map may have any desired combination of artistic renderings to represent a static scene from an instant in time (e.g., a water pond).

The lower left corner of each image block 18-28 may be used as a vertex for defining the location where the graphical component should be placed on the texture map. It this case, the image block vertex will have a set of x and y coordinates that specifically relate to pixel locations on the texture map 38. However, other suitable positions could be used for applying the graphical components to the texture map, such as the center of the image blocks. As illustrated in FIG. 3A, the graphical components 30-36 are applied to the texture map 38 in a sequence of torodially incremented locations, which will cause the graphical components to wrap around the texture map as they are applied. Thus, for example, one portion of the graphical component 36 is applied to the right side of the texture map 38, while the remaining portion of this graphical component is applied to the left side of the texture map in a toroidal relationship to the other graphical components.

Figure 4:
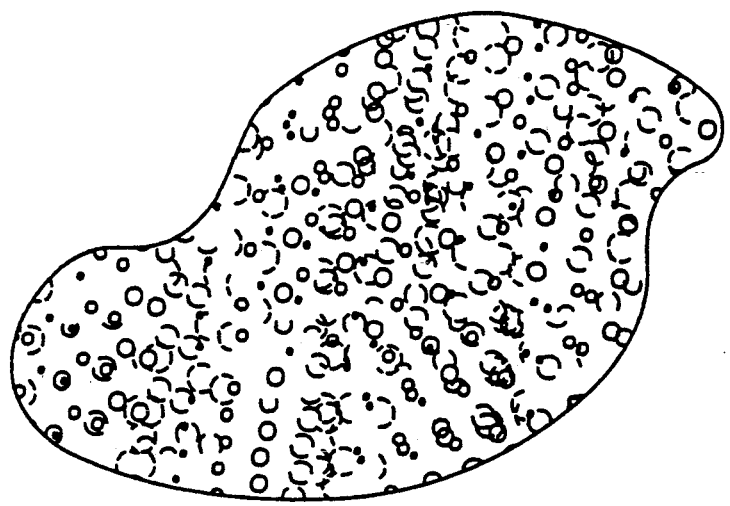
FIG. 4 is a pictorial representation of a single frame which is created from the texture map images of FIGS. 3A-3B.

FIG 3B shows that this process of applying the graphical components 30-36 will be repeated a predetermined number of times to produce a composite texture map overlay that may have desirable overlap between various graphical components. In this regard, it should be noted that this composite texture map overlay may be added or superimposed on one or more frames which contain static scenes. While the application of the graphical components appear to be linearly related, this simplicity is employed only so that the concepts involved may be more readily understood, In contrast, FIG. 4 illustrates an example of a pictorial representation of a single frame is shown which is built up a repetition of the general application process shown in FIGS. 3A-3B. As should be appreciated, the background to the scene may be assigned a predetermined color, while the graphical components may be assigned different colors to simulate fluid effects in real-time. When this frame is combined with other similar frames and transmitted to a visual projection device at a desired frame rate (e.g., 10, 24 or 30 frames/second), then the observers will perceive the dynamically altering image of rain falling on a body of water.

Figure 5A:
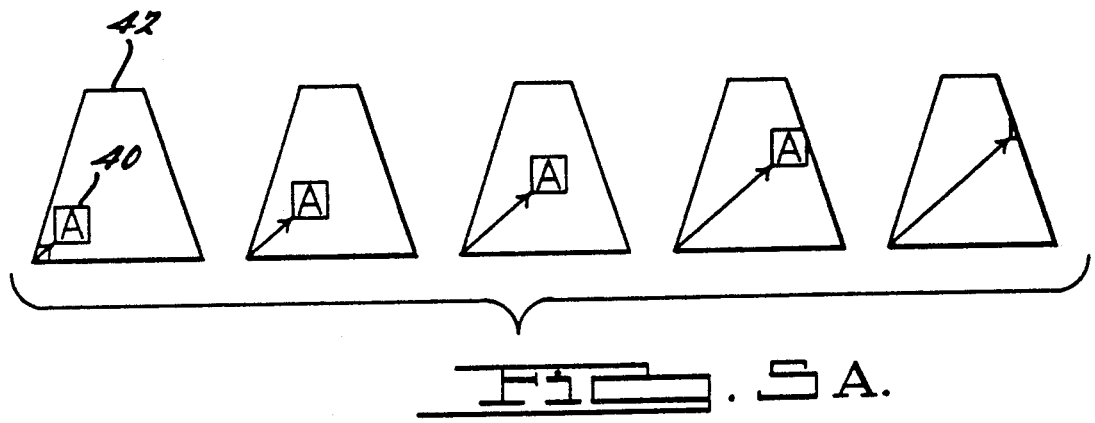
FIGS. 5A-5B provide two pictorial representations which illustrate the application of a graphical component to a texture map.
Figure 5B:
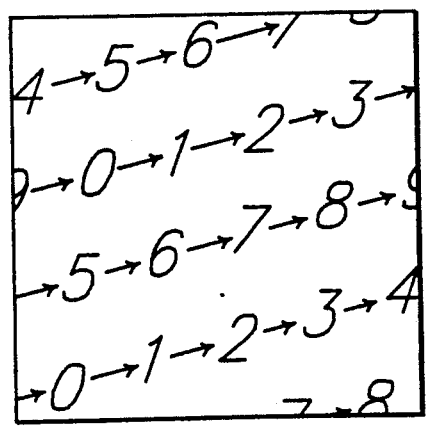

Referring to FIGS. 5A-5B, two pictorial representations are shown which illustrate the application of a graphical component 40 to a texture map having a polygon 42 to represent a static scene. In this case, a single graphical component (i.e., the letter "A") is used for simplicity, so that the method according to the present invention may be more readily understood. In this regard, the graphical component 40 is applied to the texture map in a sequence of toroidally incremented locations which are determined by a non-linear combination of a linear offset vector and a prior location of the graphical component. In the pictorial representation of FIG. 5A, the graphical component 40 will appear to move across the polygon 42 with each successive frame as a tessellating texture image. However, it is important to understand that the movement is achieved through a series of non-linear applications of the graphical component to the texture map. The non-linear magnitude of the toroidal path is shown in FIG. 5B, with each application of the graphical component 40 assigned a successive number. In this regard, the resulting non-linear vectors are represented by the arrows.

Figure 6:
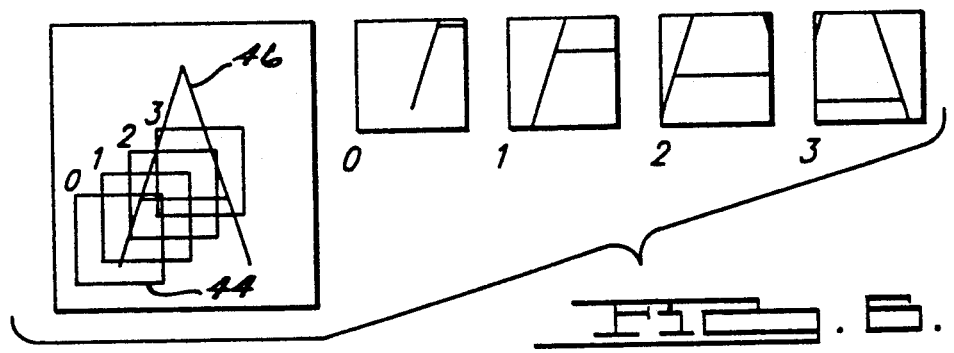
FIG. 6 is a pictorial representation of an application in which the viewing area is moved across a texture map.

Referring to FIG. 6, a pictorial representation of an application is shown in which the viewing area is moved across a static image. In this case, the predictability of at he offset vector is used to move the viewing window 44 across the letter "A". Accordingly, the graphical component may be comprised of an area which is opaque to all but the windowed area. The resulting effect to the observer will have the appearance of an overlay large letter "A" moving across the screen of the visual projection device.

Figure 7A:
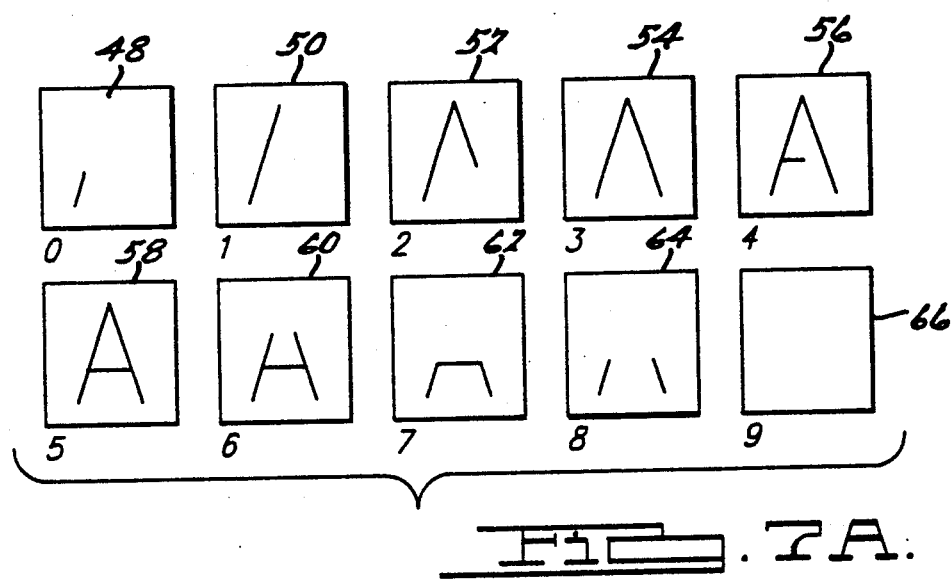
FIGS. 7A-7B provides a series of pictures which illustrate the combination of traditional animation techniques with the method in accordance with the present invention.
Figure 7B:
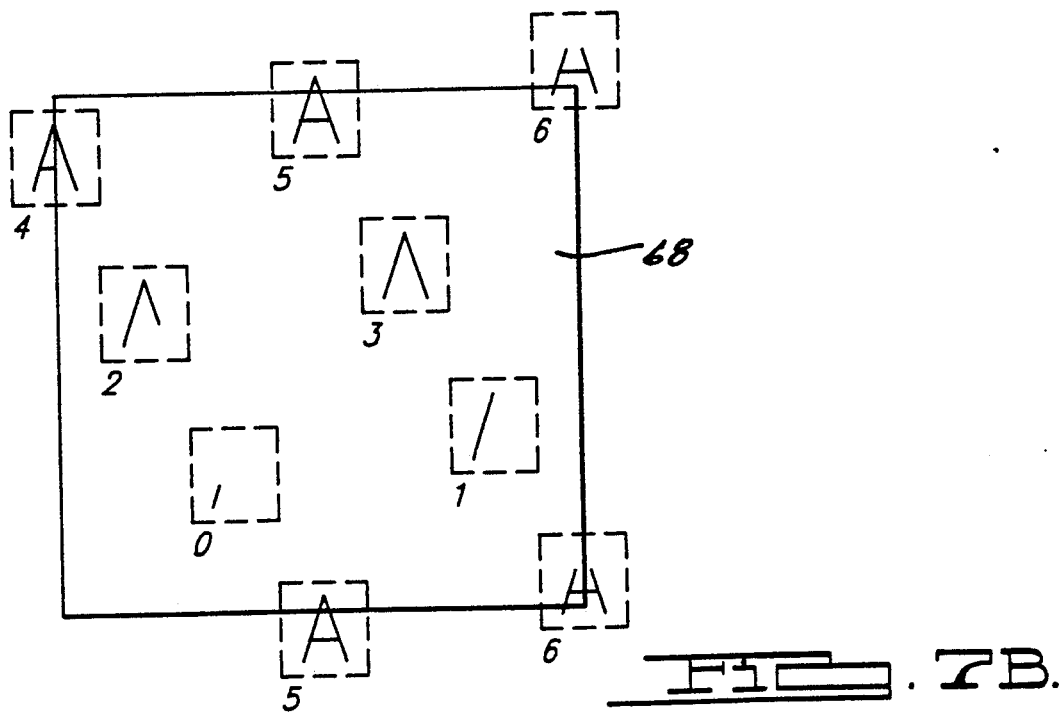

Referring to FIGS. 7A and 7B, a series of pictures is shown which illustrate the combination of traditional animation techniques with the method in accordance with the present invention. In this regard, the animation involves the successive drawing and then erasing the letter "A". Each of the image blocks 48–66 are numbered in the sequence of which they will be applied to the texture map 68 shown in FIG 7B. In this case, the multiple images will each appear to be the original sequence shown in FIG 7A, differing a time delay and the torodially incremented locations. The rate at which these graphical components will repeat on the texture map 68 will depend upon the modulo kernal of the original x and y coordinates of the offset vector and the number of times that this sequence of graphical locations is applied. If the images are such that they may be applied as a transparency or additively, as in the case of water ripples or a smoke plume, then the entire texture image may be covered with various multiple images offset in the appropriate vector for each frame of animation to produce a complete coverage of the image.

Figure 8:
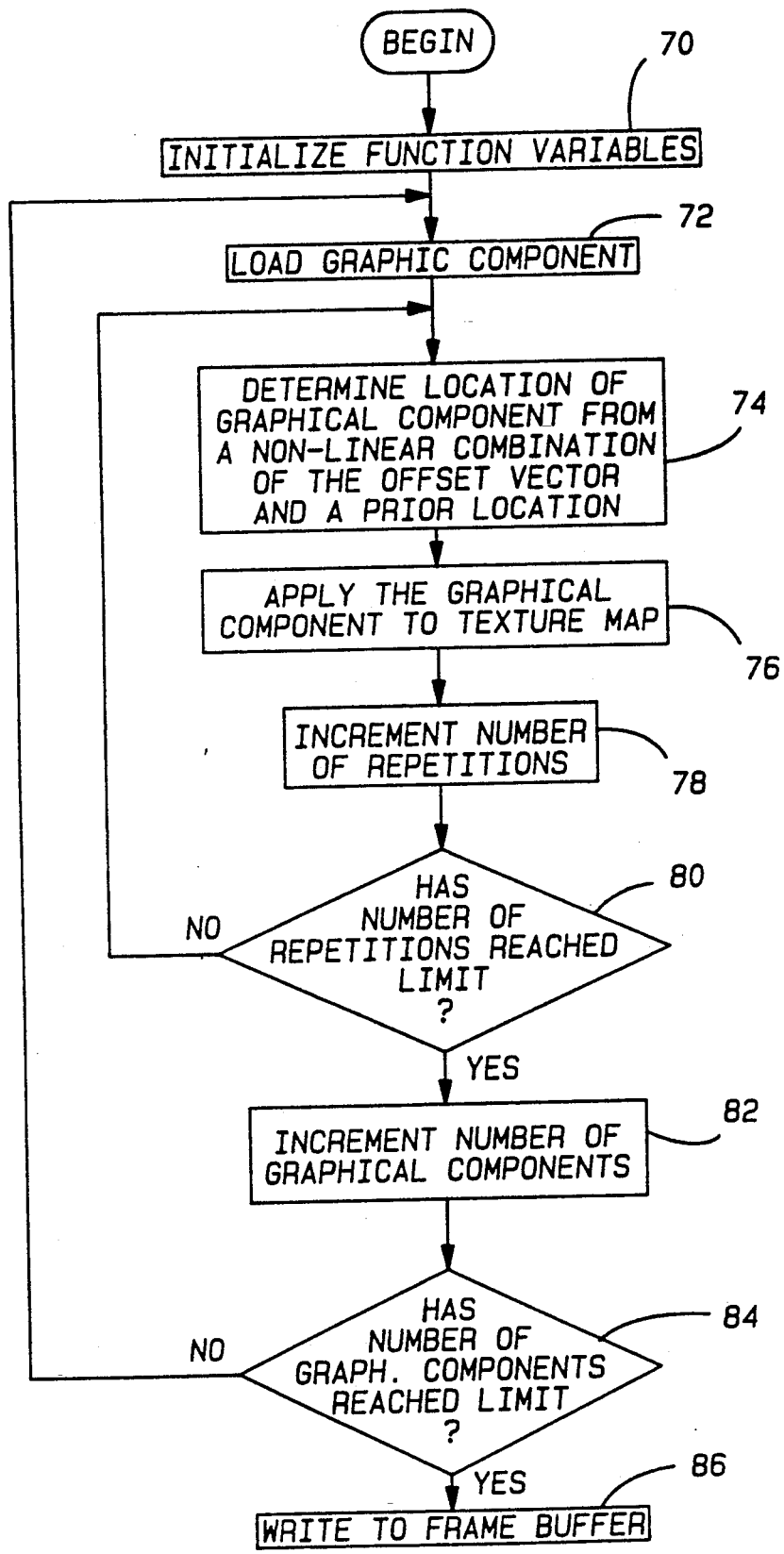
FIG. 8 is a flow chart which illustrates the method of generating dynamically altering images according to the present invention.

Referring to FIG. 8, a general flow chart is shown which illustrates the method of generating dynamically altering images according to the present invention. The flow chart begins with an initialization of the function variables (block 70). As will be shown through the psuedo-code set forth below, these function variables will include the rectangular array to be used for the texture map, the origin for the first graphical component application, and the offset vector or vectors. Then, the first graphical component will be loaded into an appropriate segment of random access memory (block 72).

Next, a determination will be made as to where the graphical component should be applied (block 74). This determination is made from a non-linear combination of the offset vector variable and a prior location. As this if the first time that a graphical component will be applied, then the prior location will be an initial location on the texture map. Once the location on the texture map has been determined, then the graphical component will be applied to the texture map (block 76). Then, a suitable counter will be incremented which represents the number of times that this particular graphical component should be applied to the texture map (block 78).

A check will then be made to see if the repetition count has reached a predetermined limit (diamond 80). If the answer is no, then the process described above will be repeated, so that this graphical component will be applied again at a torodially spaced location on the texture map until the number of repetitions has been reached. Once the repetition number has been reached, then the count of the number of graphical components will be incremented (block 82). Assuming that this predetermined number has not been reached, then the next graphical component will be loaded (block 72). However, once all of the graphical components have been applied to the texture map for the desired number of repetitions, then the composite texture map will be written out to a frame buffer to permit the complete frame to be displayed or store in a file for future image processing (block 86). Then, this entire process may be repeated for the next frame in a sequence designed to simulate motion in real-time. While the above embodiment proceeds by successively applying a single graphical component before loading the next graphical component, it should be appreciated that each graphical component could be loaded and applied once before applying the next graphical component in turn.

As an example of the method according to the present invention is shown by the following psuedo-code:

Psuedocode:
```
    Initialize xorigin[], yorigin[], ydrift[]
        /* load origin and drift arrays with values to
           produced desired dispersal, density, motions
           in texture map */
    for n = 1 to NUMBER_OF_GRAPHICAL_COMPO-
    NENTS
        do{
        load_graphical component(graphical component, n)
            /*  get nth graphical component from disk,
                video or synthesis algorithm*/
        for i = 1 to NUMBER_OF_REPETITIONS
            do{
            u = ( xorigin [i] + n * ( xdrift[i] +
                motion_u)) modulo N
            v = ( yorigin [i] + n * ( ydrift[i] +
                motion_v)) modulo M
            graphical_component_apply(graphical
                component, map, u, v)
            /*  nth graphical components combined with
                existing texture map */
        }done
    }done
end
write out map or repeat with different graphical
component sequence
```

Variables:

| | |
|---|---|
| Map [N][M] | a rectangular array to be used as the texture map |
| graphical component [K][L] | a rectangular array for each graphical component of the animation sequence, probably but not necessarily smaller than map. |
| i,n | integer counters |
| u,v | float "indexes" into map [N][M] |
| R | number of repetitions of each graphical component scattered across map |
| xorigin[R] yorigin[R] xdrift[R] ydrift[R] | origins for repetitions / scattering slight drift components to add motion complexity where desired |
| motion_u motion_v | {u,v} components that will be used as increments to (u,v) assignments in texture definitions or added to vertex (u,v) values of a polygon/surface each field/graphical component of the output graphics (image generator, workstation, video processor, etc.). |

Functions:

load_graphical_component( graphical component, n )
  Load next or nth graphical component either from a scanned/digitized image (video) or from a parametric synthesis algorithm (stages of a ripple, wave, smoke cloud etc.).
graphical_component_apply(graphical component, map, u, v)
  Algorithm that combines the image stored in {graphical component} with the image in {map} offsetting the origin of graphical component by {u,v} into {map}. Values in {graphical component} may be superimposed, averaged, "z-buffered" or added to otherwise combined with the existing values in {map}
  Since {u,v} are floats, some interpolation is assumed.
  The map is assumed toroidal so graphical components may wrap around edges of map.

From the above, it should be appreciated that the offset vector is defined by the variables "motion_u" and "motion_v", and that the drift components "xdrift[i]" and "ydrift[i]may be used to add further motion complexity. Additionally, it should be appreciated that the "for" loop in the psuedo-code employs modulo arithmetic to determine a new index (u,v) into the texture map. In other words, the remainder from the division by "N" or "M" (as the case may be) will be a number within the coordinates of the texture map.

It should also be noted that the graphical components may be windowed, clamped at their boundaries or feathered to help blend the new graphical component into the surrounding map. This avoids jagged sharp edges and provides a smoother more continuous image suitable for tessellated texture maps over large areas. Values of xdrift and ydrift may be easily replaced by parametric functions to provide nonlinear time dependent motion of the graphical component sequences.

While the above detailed description sets forth the preferred embodiments of the present invention, it will be understood that the present invention is susceptible to modification, variation and change without departing from the scope and fair meaning of the subjoined claims.

What is claimed is:

1. A method of generating a dynamically altering image simulates fluid effects in real-time on a scene, comprising the steps of:
    providing an offset vector having a non-linear element;
    loading at least one graphical component;
    forming a texture map overlay for each of a plurality of scene frames of said image comprising said graphical component in accordance with the following steps:
        repeatedly applying each of said graphical components to a texture map in a sequence of toroidally incremented locations at a predetermined repetition rate, each of said toroidally incremented locations in said sequence being determined by a combination of said offset vector non-linear element and a prior location of said graphical component;
        applying said texture map overlay to each of said plurality of scene frames; and
        transmitting each of said plurality of scene frames to a visual projection device at a predetermined frame rate in order to display said dynamically altering images.

2. The method according to claim 1, wherein said combination includes the steps of adding the length of said offset vector in each of said repetitions to the end location of the last offset vector, dividing this new location by a factor related to the size of said texture map, and using the modulo result as the new location of said graphical component.

3. The method according to claim 1, wherein said step of loading said graphical component includes the steps of opening a file containing a plurality of graphical components, and reading a predetermined graphical component from said file.

4. The method according to claim 1, wherein said step of loading said graphical component includes the step of executing a routine which synthesizes said graphical component.

5. The method according to claim 1, wherein said sequence of toroidally incremented locations causes said graphical component to wrap around said texture map more than once for a least one of said frames.

6. The method according to claim 1, wherein said graphical component is non-variable.

7. A method of generating a dynamically altering image which simulates fluid effects in real-time on a scene, comprising the steps of:
    providing an offset vector having a non-linear element;
    loading a plurality of graphical components;
    forming a texture map overlay for each of a plurality of scene frames of said image comprising said graphical component in accordance with the following steps:
        repeatedly applying each of said graphical components to a texture map in a sequence of toroidally incremented locations at a predetermined repetition rate, each of said toroidally incremented locations in said sequence being determined by a combination of said offset vector non-linear element and a prior location of said graphical component;
        applying said texture map overlay to each of said plurality of scene frames; and
        transmitting each of said plurality of scene frames to a visual projection device at a predetermined frame rate in order to display said dynamically altering images.

8. The method according to claim 7, wherein each of said graphical components are applied in series, so that all of said graphical components are displayed once before the first of said graphical component is applied again.

9. The method according to claim 8, wherein each of said graphical components are related to a common graphical image.

10. The method according to claim 9, wherein each of said graphical components represent a portion of a fluid.

* * * * *